United States Patent [19]

Grandis

[11] 4,061,051
[45] Dec. 6, 1977

[54] DEVICE FOR PEDAL OPERATING A MOTOR VEHICLE TRANSMISSION CONTROL

[76] Inventor: Ugolino Grandis, Via Bellavitis, 10/bis, Padova, Italy

[21] Appl. No.: 706,643

[22] Filed: July 19, 1976

[30] Foreign Application Priority Data

July 21, 1975 Italy .................... 41672/75

[51] Int. Cl.² .................... G05G 1/14; G05G 9/16
[52] U.S. Cl. ...................... 74/474; 74/478
[58] Field of Search ............ 74/473 R, 474, 478, 74/478.5, 512

[56] References Cited

U.S. PATENT DOCUMENTS

| | | | |
|---|---|---|---|
| 2,520,209 | 8/1950 | Hill | 74/474 |
| 2,540,926 | 2/1951 | Zook | 74/474 X |
| 2,600,767 | 6/1952 | Herrell | 74/474 X |
| 2,861,465 | 11/1958 | Winkle et al. | 74/473 R |
| 3,795,157 | 3/1974 | Campbell et al. | 74/473 R |

Primary Examiner—Allan D. Herrmann
Attorney, Agent, or Firm—Albert Josif; Guido Modiano

[57] ABSTRACT

A device for pedal operating a motor vehicle transmission control is disclosed, particularly for motorbikes. It comprises a shaped shaft adapted to swing, a pin substantially perpendicular to said shaft and rigidly attached thereto, a lever partially engaged with the pin, one arm projecting rigidly from the shaft and having an operative terminating portion, a tension spring effective to make said shaft substantially stable at the oscillation extremes thereof and a pedal set rigidly attached to the lever adapted to permit both the rotation of the lever and the oscillation of the shaped shaft.

4 Claims, 3 Drawing Figures

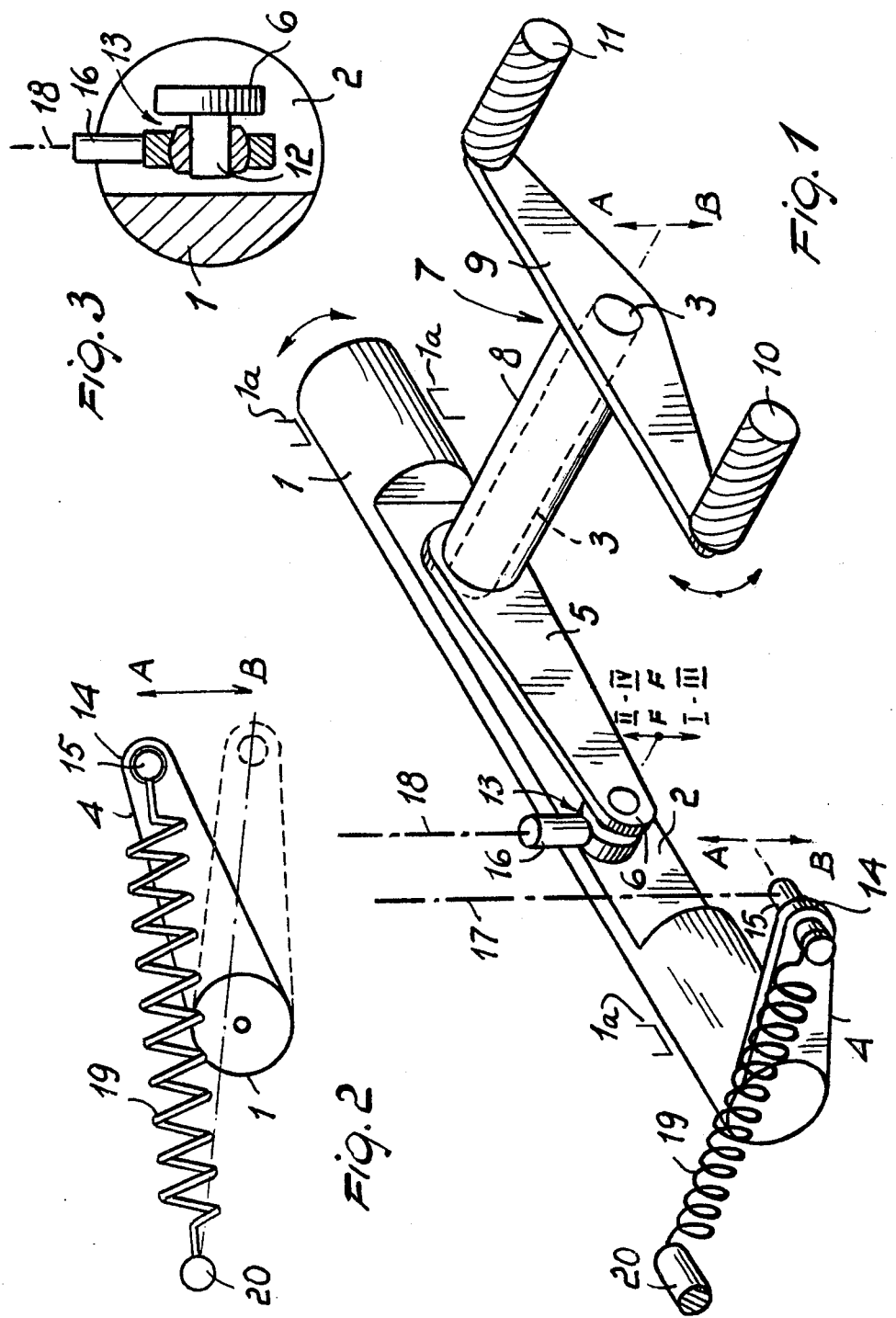

DEVICE FOR PEDAL OPERATING A MOTOR VEHICLE TRANSMISSION CONTROL

BACKGROUND OF THE INVENTION

This invention relates to a device suitable for mechanically controlling by means of a foot control pedal the engagement of the speed gears in a traditional type of automotive transmission, i.e. one originally intended for hand lever control.

It is generally agreed that it may become necessary or at least advantageous to convert the manual control of a motor vehicle transmission for pedal control, for example in those instances wherein it is preferable or even necessary not to have one hand occupied to operate the transmission gear shift control, either when a car controls are to be adapted for operation by drivers with partly disabled limbs, or more particularly, to pedal control the transmission of a motorbike equipped with an automotive type of transmission, e.g. on motorbikes propelled by an automotive type of engine-drive combination.

It is known that automotive transmissions are generally provided, when such transmissions comprise no more than four speeds including reverse, or are applied to motorbikes where the reverse gear speed is usually omitted, with a control system essentially comprised of: (a) a speed selecting mechanism which is shiftable between two positions, at each whereof two speeds may be selected; (b) a speed engaging mechanism capable of occupying three different positions, namely: drive-neutral-drive, i.e. effective to engage one of two speeds for each of the two positions of the selecting mechanism mentioned under (a) above.

Said selecting and engaging mechanisms are usually operated, in the automotive type of transmission, by acting either through two discrete control stations, a selecting one and an engaging one, or through a single control assembly performing both functions and which, with one movement, brings into operation said selecting mechanism, and with another movement, different from the previous one (e.g. with a rotational movement, whereas the former may be a linear motion type of movement), causes said engaging mechanism to become operative.

Therefore, in order to pedal control an automotive type of transmission, a device is required which is capable of effecting two discrete movements, one to be independent of the other, to differentially actuate said speed selecting and engaging mechanisms. The design problems are further aggravated by the necessity of providing a much simplified device, if it is to be really practical, featuring a high degree of sensitivity and operational reliability, and moreover, a highly compact design. Furthermore, such a device should, in order to be competitive, require foot control movements which are quite similar to those required by the pedal-controlled transmissions currently employed on motorbikes.

SUMMARY OF THE INVENTION

Thus, it is a primary object of this invention to provide a device for pedal operating the control of a transmission, which is specially simple, functional and stable, and which is highly compact and easy to operate, and similar, for the movements it requires, to the transmission pedal controls usually encountered in motorbikes.

It is a further important object of the invention to provide such a device, which is of simple and universal applicability and such as not to require, for its application, any availability of particularly complex equipment.

These and other objects, such as will become apparent hereinafter, are achieved by a device for pedal operating a motor vehicle transmission control, particularly for motorbikes equipped with an automotive type of transmission including speed selecting and engaging mechanisms, which is characterized in that it comprises: a shaped shaft supported in bearings adapted to permit a limited rotational oscillation thereof, a rigidly attached pin substantially perpendicular to said shaft, a lever partially engaged with said pin and provided with an operative end substantially intersecting said shaped shaft rotation axis, one arm projecting rigidly from said shaft and having an operative terminating portion, a resilient bias means effective to make said shaft substantially stable at the oscillation extremes thereof, and a pedal set rigidly attached to said lever and adapted to permit both the rotation of said lever and the oscillation of said shaped shaft, said operative terminating portion and said operative end being respectively connected to said speed selecting and engaging mechanisms.

BRIEF DESCRIPTION OF THE DRAWING

Further features and advantages will be more apparent from the description of a preferred, though not exclusive, embodiment of the invention, illustrated by way of example and not of limitation in the accompanying drawing, where:

FIG. 1 is a schematic perspective view of the device according to the invention;

FIG. 2 evidences a functional and constructional feature of that same device; and FIG. 3 is a cross-sectional view through the device.

DESCRIPTION OF THE PREFERRED EMBODIMENTS

Making reference to the cited figures, and specifically to FIG. 1, the inventive device comprises a shaped shaft 1 provided, preferably at an intermediate portion thereof, with a shaping adapted to permit the positioning of a member at the shaft 1 rotation axis. Said shaping may be implemented as a throw in the shaft 1 or, as shown there, as a notch or recess 2 which reduces the remaining portion of the shaft 1 to less than one half. The shaped shaft 1 engages with bearings, in turn engaging with either the engine structure or main frame of a motor vehicle or motorbike. Said bearings may be implemented in any known manner, e.g. as bushings or slots, and are accordingly with reference numeral 1a diagrammatically indicated in FIG. 1 of the drawings for clarity reasons. The only requisite feature of such bearings, also an obvious and variously implementable one, is that they are fit for limited rotary oscillations only of the shaped shaft 1, e.g. 20° to 30° oscillations.

The shaped shaft 1 is rigid with a pin 3 affixed perpendicularly to the shaft and projecting therefrom. Furthermore, the shaped shaft 1 is rigid with an arm 4, also affixed perpendicularly and projecting therefrom.

With the pin 3, and at one end thereof, a lever 5 is engaged pivotally which has at least the opposite end to that engaged with the pin 3, herein termed the operative end 6, at the recess 2 and close to the shaped shaft 1 rotation axis.

The lever 5 is operatively attached to a pedal set 7 comprising a tube 8 enclosing the pin 3 pivotably, and rigid at one end with said lever 5, and at the opposite end with a bridge 9. The latter supports a first small pedal 10 and a second small pedal 11 substantially parallel to the pin 3 and spaced apart such as to be easily actuated with the toe and heel of a foot.

The operative end 6 of the lever 5 is affixed to a pin 12 supporting, substantially at the rotation axis of the shaped shaft 1, a ball joint 13, or similar.

The arm 4 is also provided with an operative terminating portion 14, spaced at a distance from the shaped shaft 1. Both the operative terminating portion 14 of the arm 4, and the operative end 6 of the lever 5 carry lugs, respectively a first lug 15 and a second lug 16, the latter projecting from the ball joint 13, which engage with conventional mechanical means, such as a lever system or simple linkages, shown schematically with dot and dash lines and effective to actuate speed selecting and engaging mechanisms as present in an automotive transmission and previously mentioned.

More specifically, the first lug 15 engages with a first mechanical means 17 adapted to actuate the speed selecting mechanism, and the second lug 16 engages with a second mechanical means 18 which actuates the speed engaging mechanism according to the selection previously made.

The inventive device comprises resilient biasing means effective to make substantially stable the extremes of the shaped shaft 1 rotary movement. In practice, said resilient biasing means are comprised of a tension spring 19 hingedly connected at one end to the operative terminating portion 14 of the arm 4, and at the other end to a fixed pivot 20. As evidenced in FIG. 2, the fixed pivot 20 is located, with respect to the operative terminating portion 14 of the lever 4, such that at one extreme of the shaft 1 rotary oscillation movement the spring 19 has its line of action close to but not intersecting the shaft rotation axis, and at the other extreme of the shaft rotary oscillation, a line of action further away from said rotation axis. Furthermore, the spring 19 should be long enough to produce a minimal percentage variations of the spring 19 stretching at said two extremes.

The inventive device operates as follows.

In the upper position A, the speed selecting mechanism, actuated by the operative terminating portion 14, is arranged to engage the first and second speeds. As the first small pedal 10 is depressed, the ball joint 13 moves downwards and, for example, the first speed is engaged; similarly, as the second small pedal 11 is depressed, the ball joint 13 moves upwards and the second speed is engaged. The effort generated by the spring 19 in the position A is such as to oppose the pressure by the foot on the small pedals, that pressure tending to rotate the device downwards.

As both pedals are uniformly pushed down, both by the toe and heel of the foot, the shaped shaft 1 rotates overcoming the spring 19 bias, and the inventive device takes the position B. In this position, the speed selecting mechanism is arranged to engage the third and fourth speeds. A rotation of the entire device produces no translation of the ball joint 13, the latter extending along the rotation axis of the shaft 1. Said rotation of the shaft 1, moreover, almost nullifies the arm of the spring 19 force, with respect to the shaft, whereby the speed selecting mechanism is not subjected to a constant tension by the spring 19 tending to disengage or otherwise force it.

As the first small pedal 10 is depressed, the third speed becomes engaged, whereas as the second small pedal 11 is depressed the fourth speed is engaged. When the ball joint 13 is at the intermediate neutral gear position, denoted with F in FIG. 1, the residual bias of the spring 19 is adequate to overcome the overall weight of the device and bring the latter back to the starting position A, while the arm of the spring line of action is concurrently increased. In the A position, the spring 19 must indeed be capable of taking not only the device own weight but also the weight and pressure of the foot on one end only of the pedal set.

The invention as described in the foregoing is susceptible to many variations and modifications, all of which fall within the scope of the present inventive concept.

I claim:

1. A device for pedal operating a motor vehicle transmission control, particularly for motorbikes equipped with an automotive type of transmission including speed selecting and engaging mechanisms, characterized in that it comprises: a shaped shaft supported in bearings adapted to permit a limited rotational oscillation thereof, a rigidly attached pin substantially perpendicular to said shaft, a lever partially engaged with said pin and provided with an operative end substantially intersecting said shaped shaft rotation axis, one arm projecting rigidly from said shaft and having an operative terminating portion, a resilient bias means effective to make said shaft substantially stable at the oscillation extremes thereof, and a pedal set rigidly attached to said lever and adapted to permit both the rotation of said lever and the oscillation of said shaped shaft, said operative terminating portion and said operative end being repectively connected to said speed selecting mechanism and speed engaging mechanism.

2. A device according to claim 1, characterized in that said resilient bias means is comprised of a tension spring engaged on one side with said operative terminating portion of the arm and on the other with a fixed pivot positioned such that, when the shaped shaft oscillates about the rotation axis thereof, said axis never intersects said tension spring line of action and extends, at an extreme position of such an oscillation, very close to said line of action, said spring being located in a position so as to support the weight of the device.

3. A device according to claim 1, characterized in that said pedal set is pivotally supported by said pin and provided with a first small pedal and a second small pedal symmetrically disposed with respect to said pin and adapted to permit, when individually operated, opposed rotations of said lever and, when simultaneously operated, said rotational oscillation of said shaped shaft.

4. A device according to claim 1, characterized in that said operative end of said lever carries, in a position substantially intersecting the rotation axis of said shaped shaft, a joint.

* * * * *